United States Patent [19]

Markusch et al.

[11] 4,238,378

[45] Dec. 9, 1980

[54] CATIONIC ELECTROLYTE-STABLE DISPERSIONS AND PROCESS FOR PRODUCING POLYURETHANES USEFUL THEREIN

[75] Inventors: Peter Markusch, New Martinsville, W. Va.; Klaus Noll, Cologne; Dieter Dieterich, Leverkusen, both of Fed. Rep. of Germany

[73] Assignee: Bayer Aktiengesellschaft, Leverkusen, Fed. Rep. of Germany

[21] Appl. No.: 849,689

[22] Filed: Nov. 8, 1977

[30] Foreign Application Priority Data

Nov. 11, 1976 [DE] Fed. Rep. of Germany ....... 2651505

[51] Int. Cl.$^3$ ..................... C08G 18/12; C08G 18/32; C08L 75/08; C08L 75/12
[52] U.S. Cl. ................ 260/29.2 TN; 528/67; 528/68; 528/69; 528/71
[58] Field of Search .............. 260/29.2 TN; 528/67, 528/68, 69, 71

[56] References Cited

U.S. PATENT DOCUMENTS

| | | | |
|---|---|---|---|
| 3,479,310 | 11/1969 | Dieterich et al. | 260/29.2 TN |
| 3,796,678 | 3/1974 | Bartizal | 260/29.2 TN |
| 3,905,929 | 9/1975 | Noll | 260/29.2 TN |
| 3,920,598 | 11/1975 | Reiff et al. | 260/29.2 TN |
| 3,935,146 | 1/1976 | Noll et al. | 260/29.2 TN |
| 3,951,897 | 4/1976 | Matsuda et al. | 260/29.2 TN |
| 3,993,615 | 11/1976 | Markofsky et al. | 260/29.2 TN |
| 4,028,313 | 6/1977 | Muller et al. | 260/29.2 TN |
| 4,046,729 | 9/1977 | Scriven et al. | 260/29.2 TN |
| 4,048,001 | 9/1977 | Remley | 260/29.2 TN |
| 4,066,592 | 1/1978 | Wismer et al. | 260/29.2 TN |
| 4,068,035 | 1/1978 | Violland et al. | 260/29.2 TN |
| 4,092,286 | 11/1978 | Noll et al. | 260/29.2 TN |

*Primary Examiner*—Wilbert J. Briggs, Sr.
*Assistant Examiner*—Arthur H. Koeckert
*Attorney, Agent, or Firm*—Gene Harsh; Joseph C. Gil; R. Brent Olson

[57] ABSTRACT

The instant invention is directed to novel polyurethane cationic electrolyte-stable dispersions characterized by lateral or terminal polyalkylene oxide polyether chains containing from 2 to 10%, by weight, of ethylene oxide units, based on the total weight of the polyurethane; a content of

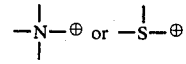

groups of from 16 to 100 milliequivalents per 100 g of polyurethane; an average particle size of from 50 to 300 mµ; and a solids content of from 10 to 45%.

7 Claims, No Drawings

CATIONIC ELECTROLYTE-STABLE DISPERSIONS AND PROCESS FOR PRODUCING POLYURETHANES USEFUL THEREIN

BACKGROUND OF THE DISCLOSURE

Aqueous dispersions of polyurethanes or polyurethane ureas are known (cf., for example, Angewandte Chemie, 82, (1970) pages 53 to 63; U.S. Pat. Nos. 3,905,929 and 3,920,598). These dispersions are of a high quality.

Not least among the factors which contribute to this high quality is the fact that many of these dispersions are free from emulsifiers. They contain chemically incorporated hydrophilic centers which make the otherwise hydrophobic elastomers self-emulsifiable.

The hydrophilic centers incorporated in known water-dispersible polyurethanes and polyurethane ureas may be both salt-like, i.e., ionic groups, and also hydrophilic non-ionic groups.

The first of these two types of polyurethanes, known as "polyurethane ionomers", include both polyurethanes containing chemically fixed cations, i.e., in particular, chemically incorporated ammonium ions, and also polyurethanes containing chemically fixed anions (e.g., incorporated sulfonate or carboxylate groups). The second of these two types of polyurethanes, i.e., non-ionic water-dispersible polyurethanes, include, in particular, the polyurethanes and polyurethane ureas containing polyethylene oxide chains as described in U.S. Pat. Nos. 3,905,929 and 3,920,598.

The dispersions of these polyurethanes have different characteristic property spectrums, depending upon the type of hydrophilic center. Thus, polyurethane ionomers dispersions are resistant to heat up to their boiling point because the solubility of the salt groups present in them is substantially unaffected by temperature. On the other hand, ionic dispersions coagulate when heated to only a moderate temperature (about 60° C.) because the polyethylene oxide side-chains gradually lose their solubility in water at elevated temperature. Unlike ionomers, however, these dispersions are unaffected by the addition of substantially unlimited quantities of electrolytes and are even stable after freezing and thawing.

The sensitivity to electrolytes of cationic polyurethanes is particularly high. Polyurethanes containing quaternary ammonium or tertiary sulfonium groups dispersed in water coagulate immediately, even when only very small quantities of an electrolyte containing monofunctional ions, such as sodium chloride, in aqueous solution are added to them. Due to this property, considerable problems are involved in the production and use of cationic polyurethane dispersions. Thus, water which is substantially free from ions generally has to be used for the production thereof. "Hard" water undesirably coarsens the dispersed particles or leads to partial coagulation.

In many cases, cationic dispersions are difficult to pigment because ions adsorbed on the surface of the pigment make the pigment difficult to incorporate and give rise to inhomogeneities. The extreme sensitivity of cationic polyurethane dispersions to various types of additives has made them very difficult or even impossible to use on a commercial scale. On the other hand, cationic dispersions have particularly desirable properties, for example, extremely good adhesion to various substrates and an excellent film-forming capacity.

The present invention provides new water-dispersible cationic polyurethanes which, in the form of an aqueous dispersion, combine the advantage of excellent resistance to frost and electrolytes with the advantage of very high temperature stability.

DESCRIPTION OF THE INVENTION

It has surprisingly been found that water-dispersible cationic polyurethane elastomers of this type may be produced when both (a) side chain or terminal hydrophilic chains containing ethylene oxide units and (b) cationic groups are incorporated into the polyurethane.

This is entirely surprising because it was found that mixtures of aqueous dispersions of ionic and non-ionic polyurethanes definitely do not have this combination of desirable properties. On the contrary, mixtures of this type have the disadvantages of the individual constituents.

By incorporating hydrophilic polyether segments either at the ends of the main polymer chain or in the form of side-chains, the cationic polyurethanes are protected surprisingly effectively against the effect of electrolytes. The dispersions are not precipitated by dilute sodium chloride solution.

The dispersions, according to the present invention, are distinguished from products in which the hydrophilic polyether segments are distributed statistically over the entire main polymer chain by their particularly favorable rheological behaviour. The dispersed particles show only moderate swelling which is largely confined to the peripheral zone, so that a favorable relationship between the solids content of the dispersion and its viscosity is obtained. Even 40% dispersions are still free-flowing.

Accordingly, the present invention relates to electrolyte-stable aqueous dispersions of polyurethane cationomers, characterized by:

(a) lateral or terminal polyalkylene oxide-polyether chains containing from 2 to 10%, by weight, of ethylene oxide units, based on the total polyurethane;

(b) a content of

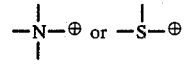

groups of from 16 to 100 milliequivalents per 100 g of polyurethane;

(c) an average particle size of the dispersed polyurethane of $<300$ m$\mu$; and (d) a solids content of from 10 to 45%.

Furthermore, the present invention also relates to a preferred process for producing the water-dispersible polyurethane elastomers, according to the present invention having a subtantially linear molecular structure. The process broadly comprises reacting:

(a) an organic diisocyanate, (b) an organic compound which is difunctional in the isocyanate-polyaddition and which contains terminal isocyanate-reactive hydrogen atoms, (c) a first hydrophilic material selected from the group consisting of (i) diisocyanate which contain lateral hydrophilic chain containing ethylene oxide (i.e., —CH$_2$—CH$_2$—O—) units, (ii) compounds which are difunctional in the isocyanate-polyaddition reaction, which contain isocyanate reactive hydrogen atoms and which contain lateral hydrophilic chains containing ethylene oxide units, (iii) monoisocyanates having hydrophilic chains containing ethylene oxide units, (iv) compounds which are monofunctional in the isocyanate-polyaddition reaction, which contain isocyanate-reactive hydrogen atoms, and which contain hydrophilic chains containing ethylene oxide units, and (v) mixtures thereof, and (d) a second hydrophilic material selected from the group consisting of (i) mono- and/or diisocyanate which contain cationic groups or groups convertible thereto, (ii) compounds which are mono- and/or difunctional in the isocyanate polyaddition reaction, which contain isocyanate-reactive hydrogen atoms and which contain cationic groups or groups convertible thereto.

The amounts of (c) and (d) are selected so that the polyurethane obtained contain from 2 to 10%, by weight, of laterally or terminally incorporated ethylene oxide units and from 16 to 100 milliequivalents of cationic groups, preferably $=N=\oplus$ and/or $=S-\oplus$ groups per 100 grams. Where component (d) contains ionizable groups, the degree of conversion to ionic groups is selected so that the final polymer meets the above definition, i.e., from 16 to 100 milliequivalents per 100 gram. The ionizable group may be converted to cationic groups during or after the reaction of the polyurethane components. The organic compound (d) is preferably one having a molecular weight of from 300 to 6,000. If desired, chain lengthening agents known and used in the polyurethane art which have molecular weights below 300 may be used as can any other additives generally known and used in the art.

Organic diisocyanates suitable for use in the above-mentioned preferred process for producing the polyurethane elastomers, according to the present invention, include organic diisocyanates corresponding to the following general formula: $R(NCO)_2$, wherein R represents an organic radical of the type obtained by removing the isocyanate groups from an organic diisocyanate having a molecular weight of from 112 to 1,000, preferably from 140 to 400. Diisocyanates particularly preferred for use in the process, according to the present invention, are those corresponding to the above-defined formula wherein R represents a difunctional aliphatic hydrocarbon radical having from 4 to 18 carbon atoms, a difunctional cycloaliphatic hydrocarbon radical having from 5 to 15 carbon atoms, a difunctional aromatic hydrocarbon radical having from 6 to 15 carbon atoms or an araliphatic hydrocarbon radical having from 7 to 15 carbon atoms. Examples of organic diisocyanates preferably used in the process according to the present invention include: tetramethylene diisocyanate; hexamethylene diisocyanate; dodecamethylene diisocyanate; cyclohexane-1,3- and -1,4-diisocyanate; 1-isocyanato-3-isocyanatomethyl-3,5,5-trimethylcyclohexane; 4,4'-diisocyanatodicyclohexylmethane; aromatic diisocyanates; such as 2,4-diisocyanatotoluene, 2,6-diisocyanatotoluene, and mixtures of these aromatic diisocyanates; 4,4'-diisocyanatodiphenyl methane; 1,5-diisocyanatonaphthalene; and the like. Mixtures of diisocyanates can, of course, be used.

Compounds which are difunctional in the isocyanatepolyaddition reaction containing terminal isocyanate-reactive groups, preferably include those having molecular weights of from 300 to 6,000, preferably from 500 to 3,000. Examples include:

(1) dihydroxy polyesters generally known in polyurethane chemistry, of dicarboxylic acids (such as succinic acid, adipic acid, suberic acid, azelaic acid, sebacic acid, phthalic acid, isophthalic acid, terephthalic acid, tetrahydrophthalic acid and the like) and diols (such as ethylene glycol, 1,2-propylene glycol, 1,3-propylene glycol, diethylene glycol, 1,4-butane diol, 1,6-hexane diol, 1,8-octane diol, neopentyl glycol, 2-methyl-1,3-propane diol, the various isomeric bis-hydroxymethyl cyclohexanes and the like);

(2) polylactones generally known in polyurethane chemistry, such as the polymers of $\epsilon$-caprolactone started with the above-mentioned dihydric alcohols;

(3) polycarbonates generally known in the polyurethane chemistry which may be obtained, for example, by reacting the above-mentioned diols with diaryl carbonates or with phosgene;

(4) polyethers generally known in polyurethane chemistry, such as the polymers and copolymers of styrene oxide, propylene oxide, tetrahydrofuran, butylene oxide or epichlorhydrin obtained using dihydric starter molecules, such as water, the above-mentioned diols or amines containing 2 NH—bonds; ethylene oxide may also be used with the proviso that the polyether used contains at most about 10%, by weight, of ethylene oxide; in general, however, polyethers obtained without ethylene oxide are used;

(5) polythioethers, polythio mixed ethers and polythioether esters generally known in polyurethane chemistry;

(6) polyacetals, for example, of the above-mentioned diols and formaldehyde, generally known in polyurethane chemistry; and also (7) difunctional terminal polyether esters containing isocyanate-reactive groups which are generally known in the art.

Dihydroxy polyesters, dihydroxy polylactones, dihydroxy polyethers and dihydroxy polycarbonates are preferably used in the process according to the present invention.

The polyurethanes, according to the present invention, may also be produced without relatively high molecular weight polyhydroxyl compounds, i.e., using only diisocyanates and low molecular reactants (molecular weight <300).

The low molecular weight reactant (i.e., molecular weight <300) which may be used alone or in combination with the higher molecular weight materials in the process, according to the present invention, for producing the self-dispersible polyurethanes include, for example, the low molecular weight diols described above with reference to the production of the dihydroxy polyesters; and diamines, such as diaminoethane, 1,6-diaminohexane, piperazine, 2,5-dimethylpiperazine, 1-amino-3-aminomethyl-3,5,5-trimethyl cyclohexane, 4,4'-diaminodicyclohexyl methane, 1,4-diaminocyclohexane, 1,2-propylene diamine or even hydrazine, amino acid hydrazides, hydrazides of semi-carbazidocarboxylic acids, bis-hydrazides, bis-semi-carbazides and the like.

It may be particularly advantageous, especially in cases where relatively large quantities of hydrophilic groups are present, partly to offset the hydrophilicity with lateral hydrophobic groups. Suitable synthesis components include, for example, oleyl diethanolamine, stearyl diethanolamine, adducts of long-chain alkyl isocyanates with diethanolamine, esterification products of long-chain fatty acids with glycerol or trimethylol propane, adducts of $C_6$-$C_{24}$ amines or phenols with glycidol or 3-ethyl-3-hydroxymethyl oxetane and the like.

In addition to the synthesis components which are difunctional in the isocyanate-polyaddition reaction, it is also possible in certain cases, where branching of the polyurethanes is required, to use synthesis components having a functionality of three or more which are generally known in polyurethane chemistry. This is particularly advantageous in cases where monofunctional hydrophilic polyethers are used. However, the average functionality of the synthesis components should preferably not exceed 2.1.

Both ionic and non-ionic compounds must be used. They may be both monofunctional and difunctional in the context of the isocyanate addition reaction. Such compounds include:

(c) diisocyanates and/or compounds which are difunctional in the isocyanate-polyaddition reaction containing isocyanate-reactive hydrogen atoms, and, which diisocyanates and compounds contain lateral hydrophilic chains containing ethylene oxide units and/or mono-isocyanates having hydrophilic chains containing ethylene oxide units and/or compounds which are monofunctional in the isocyanate-polyaddition reaction containing isocyanate-reactive hydrogen atoms and which contain hydrophilic chains containing ethylene oxide units; and (d) any monoisocyanates or diisocyanates and/or compounds which are mono- or di-functional in the isocyanate-polyaddition reaction containing isocyanate-reactive hydrogen atoms and which isocyanates and compounds contain cationic groups or groups convertible thereto.

The preferred bifunctional hydrophilic components having lateral hydrophilic chains containing ethylene oxide units include compounds corresponding to the following general formula:

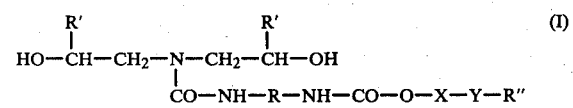

and/or compounds corresponding to the following general formula:

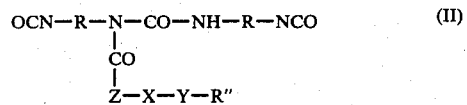

Particularly preferred hydrophilic components (c) are those corresponding to general formula (I) above.

In general formulae (I) and (II) above,

R represents a difunctional radical of the type obtained by removing the isocyanate groups from a diisocyanate corresponding to the general formula: R(NCO)$_2$ of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal oxygen atom from a polyalkylene oxide chain having from 5 to 90 chain members preferably from 20 to 70 chain members, of which at least 40%, preferably at least 65%, consists of ethylene oxide units and which, may also represent other alkylene oxides such as propylene oxide, butylene oxide or styrene oxide units, preferably propylene oxide units;

Y preferably represents oxygen or even —NR'''— where in R''' corresponds to its definition to R"; and Z represents a radical which corresponds to Y.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that, instead of using the monofunctional polyether alcohols mentioned therein as starting materials, it is also possible to use those of the type where the polyether segment, in addition to ethylene oxide units, also contains up to 60%, by weight, based on polyether segment, of other alkylene oxide units such as propylene oxide, butylene oxide or styrene oxide units, preferably propylene oxide units. The presence of such "mixed polyether segments" may afford specific advantages in certain cases.

Other particularly preferred hydrophilic components for incorporating lateral or terminal hydrophilic chains containing ethylene oxide units include compounds corresponding to the following general formula:

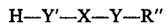

and/or compounds corresponding to the following general formula:

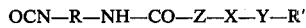

wherein

X, Y, Z, R and R" are as defined above; and

Y' corresponds in its meaning to Y, but may additionally represent —NH—.

Monofunctional polyethers are preferably used, but preferably only in molar quantities of ≦10%, based on the polyisocyanate used, to guarantee the required high molecular weight structure of the polyurethane elastomers. In cases where relatively large molar quantities of monofunctional alkylene oxide polyethers are used, it is advantageous also to use trifunctional compounds containing isocyanate-reactive hydrogen atoms, although the average functionality of the synthesis components (polyisocyanates and polyhydroxyl compounds) should preferably not exceed 2.1.

The monofunctional hydrophilic synthesis components are produced in accordance with the processes described in U.S. Pat. Nos. 3,905,929 and 3,920,598 by alkoxylating of a monofunctional starter, such as n-butanol or n-methyl butylamine, using ethylene oxide and optionally another alkylene oxide, for example propylene oxide. The resultant product may be optionally further modified (although this is less preferred) by reaction with excess quantities of diisocyanates or by reaction with ammonia to form the corresponding primary aminopolyethers.

Synthesis components (d) essential to the present invention are preferably compounds which are mono- or difunctional in the isocyanate polyaddition reaction containing incorporated tertiary amine nitrogen atoms which, after the polyurethane has been synthesized, are converted into the corresponding ammonium ions by quaternization and/or neutralization. Examples of such compounds are described in U.S. Pat. No. 3,479,310 (the disclosure of which is herein incorporated by reference), column 4, lines 11 to 62. Suitable neutralizing or quaternizing agents are described, for example, in the U.S. Patent in column 6, lines 14 to 25.

The compounds described, for example, in U.S. Pat. No. 3,419,533 (the disclosure of which is herein incorporated by reference), column 3, line 75 to column 4, line 51 can be used as hydrophobic components for the incorporation into the polyurethane of tertiary sulfonium groups, which are generally less preferred than the ammonium groups.

Basically, it does not matter how the cationic centers are incorporated into the polyurethane. For example, apart from the methods described in the two above-mentioned U.S. Patents, it is also possible to produce a polyurethane or NCO-prepolymer containing epoxy groups and to introduce the basic center by reacting the epoxy group with a primary or secondary amine, the thus-introduced basic center subsequently being converted into the salt form by an inorganic or organic acid or an alkylating agent.

In the process according to the present invention, the type and quantity of component (c) is selected in such a way that the polyurethanes, according to the present invention, contain from 2 to 10%, by weight, preferably from 4 to 8%, by weight, of laterally or terminally incorporated ethylene oxide units, —CH$_2$—CH$_2$—O—. In the process according to the present invention, the type and quantity and degree of neutralization or quaternization of the components (d) is selected in such a way that the polyurethanes, according to the present invention, contain from 16 to 100 milliequivalents per 100 g, preferably from 16 to 40 milliequivalents per 100 g, cationic groups and preferably of

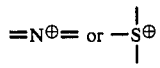

groups. The sum of the number of milliequivalents of incorporated ionic groups per 100 g of polyurethane and the number of "pseudomilliequivalents" of incorporated lateral or terminal ethylene oxide units per 100 g of polyurethane preferably amounts to from 20 to 120 and, with particular preference, to from 24 to 56.

One "pseudomilliequivalent" of laterally or terminally incorporated ethylene oxide unit is to be understood to be the quantity of ethylene oxide units incorporated in a polyalkylene oxide chain which makes the same contribution towards the dispersibility of the polyurethane in water as one milliequivalent of incorporated ionic group. (The effectiveness of the above-mentioned ionic groups in terms of the contribution thereof towards the dispersibility of the polyurethane is determined solely by the number of milliequivalents of ionic groups and not by the nature of the ionic groups.) In the aqueous polyurethane dispersions, the average particle diameter of the dispersed polyurethane particles depends upon the concentration of the incorporated hydrophilic centers in the polyurethane. Thus, the average particle size generally increases with decreasing concentration of hydrophilic centers for otherwise the same structure of the polyurethane. Studies have shown that, with otherwise exactly the same molecular structure, the ionic groups in any water-dispersible, exclusively ionically modified polyurethane may always be replaced by a certain quantity of ethylene oxide arranged laterally or terminally in a polyether chain in such a way that a corresponding, exclusively non-ionically modified polyurethane is obtained which, when dispersed in water, has the same average particle size (assuming that the polyurethane dispersion has been produced by an analogous method) when the milliequivalents of ionic groups present in the ionically modified polyurethane are replaced by the same number of "pseudomilliequivalents" of non-ionic groups. Thus, 0.5 g of ethylene oxide units laterally or terminally incorporated in a polyether chain correspond to one milliequivalent of incorporated ionic groups. Accordingly, one "pseudomilliequivalent" of non-ionic groups is equivalent to 0.5 g of ethylene oxide units incorporated in a lateral or terminal polyether chain. This means that an aqueous dispersion of an exclusively ionically-modified polyurethane containing 16 milliequivalents per 100 g of one of the above-mentioned ionic groups contains dispersed polyurethane particles having the same average particle diameter as an analogously synthesized and produced, exclusively non-ionically-modified polyurethane dispersion containing 8 g per 100 g of ethylene oxide incorporated in a polyether chain.

The process according to the present invention for producing the self-dispersible polyurethanes may be carried out in accordance with the methods known in polyurethane chemistry both by the one-stage process and by the two-stage process (prepolymer process).

For producing the self-dispersible polyurethanes, the reactants are used in an equivalent ratio of isocyanate groups to isocyanate-reactive groups of from 0.8:1 to 2.5:1, preferably from 0.95:1 to 1.5:1. The use of an NCO excess naturally results in the formation of compounds containing NCO groups which, when converted into an aqueous dispersion, react further with the water, accompanied by chain-extension, to form the dispersed end product. Accordingly, the above equivalent ratio embodies all the components involved in the synthesis of the polyurethanes according to the present invention, including the amino-group-containing chain-extenders optionally used in the form of aqueous solutions, but not the proportion of water used for dispersing the polyurethanes which reacts with any NCO-group-containing compounds present in a chain-extending reaction.

Both the one-stage process and the two-stage process may be carried out in the presence or absence of solvents. Suitable solvents (especially if, as described below, it is intended to convert the polyurethanes into an aqueous dispersion during or after the production thereof) include, for example, water-miscible solvents that are inert with respect to isocyanate groups and which boil at temperatures below 100° C., such as acetone or methyl ethyl ketone.

For carrying out the one-stage process, the difunctional compounds containing terminal isocyanate-reactive groups and having molecular weights of from 500 to 6,000 mentioned under (1) to (7) above are mixed with the hydrophilic components (c) and (d) and with the optional chain-extender having a molecular weight below 500. The diisocyanate component is then added to the thus-obtained mixture in the absence of solvents, after which the reaction mixture is reacted, preferably at temperatures of from 50° to 150° C., and optionally after the addition of catalysts generally known in polyurethane chemistry. The quantity in which the diisocyanate components are used is such that an NCO:OH ratio of from 0.8 to 1.05 prevails. During the reaction, the viscosity of the reaction mixture increases so that one of the above-mentioned solvents is gradually added to the mixture. Finally, an organic solution of the fully reacted polyurethane is obtained, its concentration preferably being adjusted to from 10 to 70%, by weight, more especially to from 15 to 55%, by weight, expressed as solids. In this one-stage process, it is particularly recommended to use tertiary amines containing two alcoholic hydroxyl groups as component (d). In cases where compounds containing groups convertible into cationic groups are used as component (d), it is recommended to effect this conversion by known neutralization or quaternization after the polyaddition reaction either in organic solution or in such a way that the polyurethane in the form of an organic solution is neutralized during its conversion into an aqueous dispersion by neutralizing agents present in the water.

In that case, the dissolved polyurethane elastomers are best converted into an aqueous dispersion by adding water to the stirred solution. In many cases, the solution passes through the phase of a water-in-oil emulsion, after which it changes into an oil-in-water emulsion, simultaneously overcoming a viscosity maximum. Removal of the solvent by distillation leaves behind a pure aqueous stable dispersion.

For carrying out the two-stage process, an NCO-prepolymer is preferably initially prepared in the melt from excess diisocyanates, relatively high molecular weight compound having isocyanate-reactive groups of the type exemplified in (1) to (7) above and hydrophilic components (c) and (d), maintaining an NCO/OH-ratio of from 1.1:1 to 3.5:1, preferably from 1.2:1 to 2.5:1, in the absence of solvents or even in the presence of solvents. Where it is prepared in the absence of solvents, the NCO-prepolymer is subsequently taken up, for example in a suitable solvent. The thus-obtained solution of the prepolymer may then be reacted in known manner with the chain-extender having a molecular weight below 300 of the type exemplified above. To prepare the polyurethane dispersions according to the present invention, it is particularly recommended to adopt a particular embodiment of the two-stage process in which water or a water/solvent mixture is added in small quantities to the described solution of the NCO-prepolymer with the solution of the chain-extender (in this case, the above-mentioned diamines and hydrazine derivatives are preferably used as chain-extenders) in such a way that the NCO:OH-ratio is from 2.5 to 1.05. This reaction may be carried out at room temperature or, preferably, even at temperatures of from 25° to 60° C. By subsequently adding the rest of the water and removing the solvent, the polyurethane dispersion is finally obtained. However, it is also possible in this embodiment of the process to dissolve the chain-extender in the total quantity of the water ultimately present in the dispersion (from 50 to 200%, by weight, based on solid polyurethane).

However, the two-stage process described above may also be carried out in the absence of solvents without any real difficulties by preparing the described NCO-prepolymer in solvent-free form and stirring it as a melt into the water. In this case, too, the above-mentioned chain-extenders containing amino groups may be used in solution in the water.

The water-dispersible polyurethane elastomers, according to the present invention, are of predominantly linear molecular structure and are characterized by a content of ethylene oxide incorporated in a lateral or terminal polyether chain of from 2 to 10%, by weight, preferably from 4 to 8%, by weight, and by a content of cationic groups

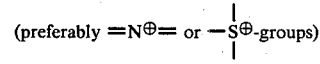

of from 16 to 100 milliequivalents, preferably from 16 to 40 milliequivalents, per 100. The lateral polyalkylene oxide chain which contains the ethylene oxide units essential to the present invention is preferably attached through groups:

(i) corresponding to the following general formula:

or (ii) corresponding to the following general formula:

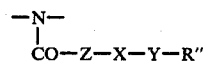

wherein

R, R", X, Y and Z are as defined above.

The process, according to the present invention, as described above, merely represents the preferred method, but by no means the only method of obtaining the polyurethanes, according to the present invention. Another method of obtaining the polyurethanes, according to the present invention, is, for example, to introduce the non-ionic lateral hydrophilic groups into a preferably linear polyurethane elastomer already containing ionic groups or groups convertible thereto by reacting this elastomer with hydrophilic monoisocyanates corresponding to the following general formula:

wherein

R, X, Y and R" are as defined above.

Hydrophilic monoisocyanates of this type are produced in analogy to the process described in U.S. Pat. No. 3,905,929 (the disclosure of which is herein incorporated by reference), although it is pointed out in addition to this disclosure, instead of using the monofunctional polyether alcohols mentioned there as starting materials, it is possible to use those of which the polyether segment, in addition to ethylene oxide units, also contains up to 60%, by weight, preferably up to 35%, by weight, based on polyether segment, of propylene oxide, butyl oxide or styrene oxide units, preferably propylene oxide units.

In cases where the polyurethanes according to the present invention are produced using these hydrophilic monoisocyanates, a linear polyurethane is preferably prepared from the above-mentioned starting materials using an equivalent ratio of isocyanate groups to isocyanate-reactive groups of preferably 1:1, the thus-prepared linear polyurethane containing ionic groups or groups convertible thereto, but still no hydrophilic polyether segments. This linear polyurethane elastomer is then reacted in the melt or in a suitable solvent, for example, of the type mentioned above, with the hydrophilic monoisocyanates at from 50° to 150° C., producing an addition of the isocyanate group of the hydrophilic monoisocyanate with the active hydrogen atoms of the urethane and/or urea groups present in the linear polyurethane. Any groups convertible into ionic groups which may be present are then at least partly converted into the corresponding ionic groups by known neutralization or quaternization.

In another particularly preferred procedure, a prepolymer containing terminal NCO-groups is reacted with a monofunctional hydrophilic polyether so that a polymeric polyurethane having terminal hydrophilic polyether segments is formed. Such a product may, of course, also be obtained by a one-stage process by using a corresponding hydrophilic monofunctional polyether as synthesis component in the synthesis of the polyurethane. Furthermore, it is, of course, also possible to react a polymer containing terminal OH, SH, NH$_2$, NHR or COOH-groups with a hydrophilic monoisocyanate corresponding to the following general formula:

OCN—R—NH—CO—O—X—Y—R″ wherein
R, X, Y and R″ are as defined above.

This group of polyurethanes according to the present invention is characterized by the group:

—U—R—NH—CO—O—X—Y—R″ wherein
U represents —O—CO—NH—, —NH—CO—NH—, —NH—CO— or —S—CO—NH—;
and
R, X, Y and R″ are as defined above.

In cases where polyurethanes containing terminal monofunctional hydrophilic polyethers are produced, provision is preferably made for an at least weak branching of these products, for example, by the use of trifunctional or higher polyfunctional synthesis components or by partial allophanate formation, trimerization or biuret formation, although the average functionality of the synthesis components preferably does not exceed 2.1.

The polyurethane, according to the present invention, thus obtained either in the form of a melt or in the form of a solution, may then be converted into an aqueous dispersion by mixing with water and distilling off the auxiliary solvent used, if any.

Basically, the polyurethanes, according to the present invention, may be converted into aqueous dispersions by any methods including, for example, dispersion in the absence of solvents, for example, by mixing the polyurethane melt with water in apparatus which is able to generate high shear gradients and, the use of very small quantities of solvent for plasticization during processing in the same apparatus, and by using non-mechanical dispersion aids, such as soundwaves of extremely high frequency. Furthermore, in the case of polyurethane ureas, chain-extension may be carried out after the prepolymer has been converted into an aqueous emulsion. However, it is also possible to use simple mixers, for example, stirrer-equipped vessels or so-called "flow mixers", because the polyurethanes, according to the present invention, are self-dispersible.

The polyurethanes dispersed, in accordance with the present invention, have an average particle size of <300 m$\mu$, and preferably from about 10 to 250 m$\mu$.

This is the particle size range in which conventional cationic dispersions show their greatest sensitivity to additions of electrolyte. The dispersions are opaque to translucent and show a pronounced Tyndall effect, especially when they are diluted to a solids content of about 10%.

The rheological behavior of the dispersions, which it is not intended to discuss in detail here, is governed by the particle size and concentration. In the case of relatively small particles, viscosity increases, in addition to which an increasingly higher flow barrier builds up below a particle size of about 100 m$\mu$ (Bingham substance). Irrespective of this dependence, viscosity increases with increasing concentration which, with this class of dispersions, may amount to as much as 65%, in some cases up to a level of 50 P.

Despite the presence therein of cationic groups, the dispersions are largely unaffected by electrolytes. This provides, for example, for the acid-catalyzed cross-linking of the latex particles with formaldehyde or formaldehyde derivatives; similarly, they may be pigmented using electrolyte-active pigments or dyes.

The dispersions may be blended with other cationic or non-ionic dispersions, such as polyvinyl acetate, polyethylene, polystyrene, polybutadiene, polyvinyl chloride, polyvinyl acrylate and copolymer plastics dispersions. The addition of known chemically non-fixed, preferably ionic, emulsifiers is also possible, but, of course, not essential.

Furthermore, fillers, plasticizers, pigments, carbon black and silica sols, aluminum, clay and asbestos dispersions may also be incorporated into the dispersions.

The dispersions of the polyurethane compositions in water are generally stable, storable and transportable and may be processed at any later stage, for example, by forming. In general, they dry directly into dimensionally stable plastics coatings, although forming of the end products may also be carried out in the presence of known cross-linking agents. Polyurethanes having different properties are obtained, according to the chemical composition selected and to the urethane group content. Thus, it is possible to obtain soft, tacky compositions, thermoplastic and elastomeric products having a variety of different hardnesses up to glass-hard duroplasts. The hydrophilicity of the products may also vary within certain limits. The elastic products may be thermoplastically processed at elevated temperatures, for example, at from 100° to 180° C., providing they are not chemically crosslinked.

The end products of the process are suitable for coating and impregnating woven and non-woven textiles, leather, paper, wood, metals, ceramics, stone, concrete, bitumen, rigid fibers, straw, glass, porcelain, various types of plastics, glass fibers, for anti-static and crease-resistant finishing, as binders for non-wovens, adhesives, adhesion promoters, laminating agents, hydrophobizing agents, plasticizers, binders, for example, for cork powder or sawdust, glass fibers, asbestos, paper-like materials, plastics or rubber waste, ceramic materials, as auxiliaries in textile printing and in the paper industry, as additives to polymers, as sizing agents, for example, for glass fibers, and for finishing leather.

The dispersions or pastes are preferably applied to a porous substrate which subsequently remains bonded to the end product, such as woven or non-woven textile structures and fiber mats, felts or non-wovens, also paper webs, foam sheet or split leather which, by virtue of the absorbing action thereof, cause the coating to harden immediately. This is followed by drying at elevated temperature and, optionally, pressing. However, drying may also be carried out on smooth porous or non-porous materials, for example, metal, glass, paper, cardboard, ceramic materials, sheet steel, silicone rubber, aluminum foil, the resulting sheet-form structure subsequently being lifted off and used as such or applied to a substrate using a reversal process by bonding, flame lamination or calendering. Application by a reversal process may be carried out at any time.

The properties of the end products may be modified by using vinyl polymers or active or inactive fillers. It is possible to use, for example, polyethylene, polypropylene, polyvinylacetate, ethylene-vinylacetate copolymers which may optionally be (partially) hydrolyzed and/or grafted with vinyl chloride, styrene-butadiene copolymers, ethylene (graft) copolymers, polyacrylates, carbon black, silica, asbestos, talcum, kaolin, titanium dioxide, glass in the form of powder or in the form of fibers or cellulose. Depending upon the required property spectrum and the application envisaged for the end products, up to 70%, based on total dry substance, of these fillers may be present in the end product.

Dyes, pigments, plasticizers or additives which influence the flow properties may, of course, also be added.

Drying of the products obtained by various application techniques may be carried out either at room temperature or at elevated temperature. The drying temperature to be selected in each individual case, which is governed not only by the chemical composition of the material, but above all by moisture content, the drying time and the layer thickness, is readily determined by a preliminary test. For a given heating time, the dry temperature must always be below the solidification temperature.

The sheet structures may then be coated with a finish in order to increase their surface resistivity. Aqueous dispersion or solutions are again preferably used for this purpose.

Extremely rigid polyurethanes obtained from finely divided dispersions and sols are suitable for use as stoving lacquers and, in some cases, even as air-drying lacquers. They combine extreme hardness and elasticity with high gloss and, in cases where aliphatic diisocyanates are used, favorable light stability and weather resistance.

The following examples are intended to illustrate the composition, production and some physical properties.

EXAMPLE 1

Production of the Non-Ionic Hydrophilic Chain-Extender

The non-ionic hydrophilic chain-extender is produced in analogy to the process described in U.S. Pat. No. 3,905,929 by reacting equimolar parts of:
(i) a polyether monoalcohol of n-butanol, ethylene oxide and propylene oxide (in a molar ratio of 83:17) having an OH-number of 30,
(ii) 1,6-hexane diisocyanate and
(iii) diethanolamine.

The resulting diol has an average molecular weight of 2140.

Production of the Cationic PU-Dispersion 4970 parts, by weight, of a polyester diol (of adipic acid, phthalic acid anhydride and ethylene glycol having an OH-number of 67), 16,580 parts, by weight, of a polyester diol (of phthalic acid anhydride and ethylene glycol having an OH-number of 56) and 1,350 parts, by weight, of the above-described non-ionic hydrophilic material are dehydrated together for 30 minutes at 120° C. in a vacuum of 15 Torr. After cooling to 80° C., 3,377 parts, by weight, of 1,6-hexane diisocyanate are added all at once and stirred in for 10 minutes without heating, followed by stirring for 45 minutes at from 110° to 120° C. After cooling, the mixture is carefully diluted, beginning at 80° C., with a total of 11,060 parts, by weight, of acetone added in portions. 500 parts, by weight, of N-methyl diethanolamine are added to the acetone solution stirred at 60° C. and gently boiled under reflux, followed by rinsing with another 1,580 parts, by weight, of acetone, after which the solution is stirred for 1 hour at 60° C. 222 parts, by weight, of 1,2-diaminopropane are then added, and the solution is rinsed with another 1,580 parts, by weight, of acetone and diluted with a further 7,110 parts, by weight, of acetone. The acetone solution is then stirred at 60° C. 30 minutes after the amine has been added, 100 parts, by weight, of water and 1 part, by weight, of dibutyl tin dilaurate are added, followed by dilution with 10,270 parts, by weight, of acetone.

After 6 hours, no more isocyanate may be detected in the acetone solution by IR-spectroscopy. 500 parts, by weight, of dimethyl sulphate dissolved in 1,580 parts, by weight, of acetone are added, the solution is stirred for 1 hour at 50° C. and 36,000 parts, by weight, of water preheated to 50° C. are allowed to run in slowly over a period of 30 minutes, again at 50° C.

After the acetone has been distilled off in a water pump vacuum at 50° C., 1,500 parts, by weight, of a 30% formalin solution are added, giving 60,000 parts, by weight, of a stable cationic polyurethane dispersion which, for a solids content of 43%, by weight, has a pH value of 4.2 and a particle size (diameter determined by the diffusion of light) of from 142 to 149 nm.

Electrolyte Stability 50 g of a sample of this dispersion adjusted to a solids content of 10%, by weight, require 80 ml of a 10% NaCl-solution for coagulation at room temperature. A corresponding PU-dispersion produced without the non-ionic hydrophilic emulsifier coagulates after the addition of only 3.4 ml of NaCl-solution under the same test conditions.

General Procedure for Determining the Electrolyte Stability of Cationic PU-Dispersions 50 ml of a cationic PU-dispersion, adjusted to a solids content of 10%, are introduced into an Erlenmeyer flask, followed by the dropwise addition with vigorous stirring (magnetic stirrer) at room temperature of 10% aqueous NaCl solution from a stock burette. After increasing thickening, the dispersion undergoes generally sudden coagulation, in any case with a consumption of sodium chloride solution of <20 ml. With even higher electrolyte stability, difficulties are occasionally involved in determining the end point because coagulation takes place slowly with partial flocculation. In this case, end point determination is facilitated by adding the sodium chloride solution in 5 ml portions, stirring for 5 minutes after each addition and then making the assessment.

EXAMPLE 2

The dependence of electrolyte stability upon the quantity of ethylene oxide units used is illustrated by this example.

(a) 86.3 parts, by weight, of a polyester diol (of adipic acid, phthalic acid anhydride and ethylene glycol having an OH-number of 67) 307.7 parts, by weight, of a polyester diol (of phthalic acid anhydride and ethylene glycol having an OH— number of 56) and 17.2 parts, by weight, of a polyether monoalcohol of n-butanol, ethylene oxide and propylene oxide (molar ratio of ethylene oxide to propylene oxide 83:17) having an OH-number of 26 are combined and dehydrated for 30 minutes at 120° C./15 Torr. After cooling to 80° C., 67.2 parts, by weight, of 1,6-hexane diisocyanate are added and mixed in without heating over a period of 10 minutes, followed by stirring for another 110 minutes at 120° C. The NCO-content is determined (3.12%) and, after cooling to 60° C., the mixture is diluted with 80 parts, by weight, of acetone. 11.9 parts, by weight, of N-methyl diethanolamine are added, followed by stirring for 1 hour at 60° C., after which the mixture is diluted with another 80 parts, by weight, of acetone 6.6 parts, by weight, of 1-amino-methyl-5-amino-1,3,3-trimethyl cyclohexane and 1.94 parts, by weight, of hydrazine monohydrate are successively added. The mixture is stirred for 30 minutes at 60° C., diluted with another 160 parts, by weight, of acetone, and quaternized for 1 hour with 8.4 parts, by weight, of chloroacetamide. 11 parts, by weight, of 85% o-phosphoric acid are then added and, finally, 1,125 parts, by weight, of water are run in, resulting in the formation of a finely divided, blueish translucent dispersion which, after the acetone has been distilled off in vacuo (15 Torr, bath temperature 50° C.), has a solids content of 30%, a pH value of 4.2 and an average particle diameter of from 143 to 147 nm. The dispersion is extremely temperature-stable, withstanding tempering at 85° C. for 24 hours without any change in its particle size.

For a content of 2.6% of ethylene oxide units, based on PU-solids, 50 ml of a sample of this dispersion, adjusted to a solids content of 10%, consume 5 ml of 10% aqueous sodium chloride solution before coagulation.

(b) A dispersion is prepared in the same way as in Example 2(a), except that the quantity of hydrophilic polyether is increased to 21.5 parts, by weight, and, hence, the content of ethylene oxide units, based on PU-solids, to 3.3%. As a result, electrolyte stability is increased. 50 ml of a sample 2(b), adjusted to a solids content of 10%, consume 17.5 ml of a 10% sodium chloride solution before coagulation.

(c) A dispersion is prepared in the same way as in Example 2(b), except that the quantity of hydrophilic polyether is increased to 25.8 parts, by weight, and, hence, the content of ethylene oxide units, based on PU-solids, to 3.9%. As a result, electrolyte stability is increased. 50 ml of a sample 2(c), adjusted to a solids content of 10%, consume 30 ml of a 10% sodium chloride solution before coagulation.

(d) A dispersion is prepared in the same way as in Example 2(c), except that the quantity of hydrophilic polyether is increased to 30 parts, by weight, corresponding to 4.5% of ethylene oxide units, based on PU-solids. As a result, electrolyte stability is increased. 50 ml of a sample 2(d), adjusted to a solids content of 10%, consume 70 ml of a 10% sodium chloride solution before coagulation.

EXAMPLE 3

The dependence of electrolyte stability upon particle size is illustrated in this example using dispersions of the same composition.

Polyurethane dispersions are prepared from the following starting materials by the method described in Example 2:

65 parts, by weight, of a polyester diol of adipic acid, phthalic acid anhydride and ethylene glycol, OH-number 67

222.6 parts, by weight, of a polyester diol of phthalic acid anhydride and ethylene glycol, OH-number 56

16.7 parts, by weight, of non-ionic hydrophilic chain-extender according to Example 1

50 parts, by weight, of 1,6-hexane diisocyanate 8.8 parts, by weight, of methyl diethanolamine 5.7 parts, by weight, of 1-aminomethyl-5-amino-1,3,3-trimethyl cyclohexane 1.6 parts, by weight, of hydrazine monohydrate 6.2 parts, by weight, of chloroacetamide 8 parts, by weight, of o-phosphoric acid (85%)

844 parts, by weight, of water.

By varying the production conditions (time and temperature variation during prepolymer formation, quantity of solvent, etc.), dispersions having the same chemical composition, but differing in particle size, were obtained. The electrolyte stability of these dispersions was determined by the method described in Example 1. The results are set out in the following Table.

| Dispersion | Particle Size[1] (nm) | Electrolyte Stability[2] |
| --- | --- | --- |
| A | 81–83 | 2 |
| B | 91–94 | 6 |
| C | 101–102 | 6.5 |
| D | 119–123 | 8 |
| E | 140–143 | 11 |
| F | 159–165 | 12 |
| G | 232[x] | 80 |
| H | 300[x] | 130 |

[1]average particle diameter, as determined by light dispersion
[2]quantity in ml of 10% sodium chloride solution which is required to coagulate 50 ml of the dispersion, adjusted to a solids content of 10%
[x]irregular, fairly wide dispersion.

EXAMPLE 4

340 parts, by weight, of a polyester diol (of 1,6-hexane diol, 2,2-dimethyl-1,3-propane diol and adipic acid having an OH-number of 65) and 21.5 parts, by weight, of a polyether monoalcohol having an OH-number of 26 (according to Example 2) are dehydrated for 30 minutes at 120° C./15 Torr. After cooling to 80° C., 67.2 parts, by weight, of 1,6-hexane diisocyanate are added, the mixture is stirred for 30 minutes at 80° C. and then for 90 minutes at 120° C. and the NCO-content of the prepolymer is then determined (3.53%, by weight, of NCO). After cooling, the solution is slowly diluted with 80 parts, by weight, of acetone beginning at 80° C. 9.5 parts, by weight, of N-methyl diethanolamine are added to the homogeneous solution (external temperature 70° C.) which is then stirred for 1 hour and diluted with another 160 parts, by weight, of acetone. 8.5 parts, by weight, of 1-aminomethyl-5-amino-1,3,3-trimethyl cyclohexane and 2.5 parts, by weight, of hydrazine monohydrate are then successively added, after which the solution is stirred for 1 hour at an external temperature of 70° C. and diluted with another 160 parts, by weight, of acetone, after which 6.7 parts, by weight, of chloroacetamide are added. When the IR-spectrum of a sample no longer shows an NCO-band, 11 g of o-phosphoric acid (85%) are added, 1,100 parts, by weight, of water preheated to 50° C. are run in and the acetone is distilled off in a water pump vacuum for the cationic PU-dispersion formed, the bath temperature being maintained at 50° C. The resulting stable dispersion has an average particle diameter of from 126 to 130 nm and a pH value of 4.2 for a solids content of 31%, by weight. Based on solids, the product contains 3.7% by weight, of ethylene oxide segments and 17 milliequivalents of quaternary nitrogen/100 g of polyurethane.

50 ml of a sample of this dispersion, adjusted to a solids content of 10%, require 110 ml of a 10% NaCl solution for coagulation (electrolyte stability determined in accordance with Example 1).

What is claimed is:

1. Electrolyte-stable aqueous dispersions of polyurethane cationomers, characterized by:
   (a) lateral or terminal polyalkylene oxide polyether chains containing from 2 to 10%, by weight, of ethylene oxide units, based on the total weight of the polyurethane;
   (b) a content of

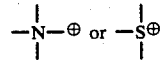

groups of from 16 to 100 milliequivalents per 100 g of polyurethane;
   (c) an average particle size of from 50 to 300 mµ; and
   (d) a solids content of from 10 to 45%.

2. A process for the preparation of water-dispersible polyurethanes having a content of from 2 to 10%, by weight, of laterally or terminally incorporated ethylene oxide units and from 16 to 100 milliequivalents of cationic groups per 100 g of polyurethane, said process comprising reacting
   (a) an organic diisocyanate,
   (b) an organic compound which is difunctional in the isocyanate-polyaddition and which contains terminal isocyanate-reactive hydrogen atoms,
   (c) a first hydrophilic material selected from the group consisting of
      (i) diisocyanates which contain lateral hydrophilic chains containing ethylene oxide (i.e., —CH$_2$—CH$_2$—O—) units,
      (ii) compounds which are difunctional in the isocyanate-polyaddition reaction, which contain isocyanate reactive hydrogen atoms and which contain lateral hydrophilic chains containing ethylene oxide units,
      (iii) monoisocyanates having hydrophilic chains containing ethylene oxide units,
      (iv) compounds which are monofunctional in the isocyanate-polyaddition reaction, which contain isocyanate-reactive hydrogen atoms, and which contain hydrophilic chains containing ethylene oxide units, and
      (v) mixtures thereof, and
   (d) a second hydrophilic material selected from the group consisting of
      (i) mono- and/or diisocyanate which contain cationic groups or groups convertible thereto,
      (ii) compounds which are mono- and/or difunctional in the isocyanate polyaddition reaction, which contain isocyanate-reactive hydrogen atoms and which contain cationic groups or groups convertible thereto.

3. A process as claimed in claim 2, wherein component (b) is a diol corresponding to the following general formula:

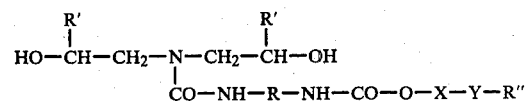

wherein
   R represents a difunctional radical of the type obtained by removing the isocyanate groups from a diisocyanate having a molecular weight of from 112 to 1,000;
   R' represents hydrogen or a monofunctional hydrocarbon radical containing from 1 to 8 carbon atoms;
   X represents the difunctional radical obtained by removal of the terminal oxygen atom from a polyalkylene oxide radical containing from 5 to 90 alkylene oxide units, at least 40% of these alkylene oxide units representing ethylene oxide units and the remaining alkylene oxide units representing propylene oxide, butylene oxide or styrene oxide units;
   Y represents oxygen or —NR'''—; and
   R'' and R''', which may be the same or different, each represents a monofunctional hydrocarbon radical containing from 1 to 12 carbon atoms.

4. A process as claimed in claim 3 wherein component (b) is a monofunctional polyether corresponding to the following general formula:

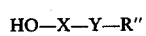

wherein X, Y and R'' are as defined above.

5. The process of claim 2 wherein component (d) contains ionizable groups and wherein said ionizable groups are converted to cationic groups during or after the reaction of the components.

6. The process of claim 2 wherein said cationic groups are

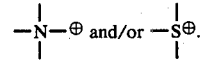

7. The process of claim 2 wherein component (b) is a compound having a molecular weight from the group consisting of
   (a) from 300 to 6,000,
   (b) less than 300, and
   (c) mixtures thereof.

* * * * *